US009530096B2

(12) United States Patent
Zhong et al.

(10) Patent No.: US 9,530,096 B2
(45) Date of Patent: Dec. 27, 2016

(54) AUTOMATIC IDENTIFICATION AND USE OF ALTERNATE USER CONTACT INFORMATION

(71) Applicant: Google Inc., Mountain View, CA (US)

(72) Inventors: Hongtao Zhong, Belmont, CA (US); Bryan Christopher Horling, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 312 days.

(21) Appl. No.: 14/313,030

(22) Filed: Jun. 24, 2014

(65) Prior Publication Data

US 2015/0371138 A1 Dec. 24, 2015

(51) Int. Cl.
G06F 15/16 (2006.01)
G06N 5/02 (2006.01)
H04L 12/58 (2006.01)
G06Q 10/10 (2012.01)

(52) U.S. Cl.
CPC ................ *G06N 5/02* (2013.01); *G06Q 10/10* (2013.01); *H04L 51/04* (2013.01)

(58) Field of Classification Search
None
See application file for complete search history.

(56) References Cited

U.S. PATENT DOCUMENTS

| 7,228,335 B2 | 6/2007 | Caughey |
| 7,904,459 B2 | 3/2011 | Grigsby et al. |
| 8,060,373 B2 | 11/2011 | Gibbon et al. |
| 8,594,288 B2 | 11/2013 | Robbins et al. |
| 8,706,827 B1 * | 4/2014 | Noble ................... G10L 13/027 704/9 |
| 2002/0016857 A1 | 2/2002 | Harari |
| 2007/0011158 A1 * | 1/2007 | Parikh .................... G06Q 10/10 |
| 2011/0119230 A1 * | 5/2011 | Zuber ............... G06F 17/30011 707/608 |
| 2013/0097124 A1 | 4/2013 | De et al. |
| 2013/0179149 A1 | 7/2013 | Talley et al. |
| 2014/0067369 A1 | 3/2014 | Stavrianou et al. |

OTHER PUBLICATIONS

PCT International Search Report and Written Opinion dated Aug. 19, 2015 for PCT International Application No. PCT/US2015/036622, 10 pages.

(Continued)

*Primary Examiner* — John B Walsh
(74) *Attorney, Agent, or Firm* — Remarck Law Group PLC

(57) ABSTRACT

Computer-implemented techniques for automatic identification and use of alternate user contact information can include identifying, at a server having one or more processors, a set of patterns from training electronic messages, each pattern indicating a pattern of contact information context. The techniques can include storing and utilizing, at the server, the set of patterns to obtain a set of alternate contact information for a target user. In response to a use of a specific alternate contact information for the target user by a source user at a computing device, the techniques can include providing, from the server to the computing device, a suggestion for the source user. Examples of the suggestion may include a virtual address for an electronic message or at a social network, a physical address for navigation, and a telephone number for calling or incoming caller identification.

22 Claims, 4 Drawing Sheets

(56) References Cited

OTHER PUBLICATIONS

PCT International Search Report and Written Opinion dated Jan. 14, 2015 for PCT International Application No. PCT/US2014/034311, 22 pages.

Ekbal, A. et al., "A web-based Bengali news corpus for named entity recognition," Language Resources & Evaluation, Issue 42, No. 2, Feb. 22, 2008, pp. 173-182.

Gruzd, A. et al., "Automated Discovery and Analysis of Social Networks from Threaded Discussions," International Network of Social Network Analysts, St. Pete Beach, Florida, 2008, pp. 1-18.

Palshikar, G., "Chapter 11—Techniques for Named Entity Recognition: A Survey," Collaboration and the Semantic Web: Social Networks, Knowledge Networks, and Knowledge Resources, Apr. 30, 2012, pp. 191-217.

PCT Invitation to Pay Additional Fees and, Where Applicable, Protest Fee including Communication Relating to the Results of the Partial International Search dated Oct. 21, 2014 for PCT International Application No. PCT/US2014/034311, 6 pages.

Talukdar, P. et al., "A Context Pattern Induction Method for Named Entity Extraction," Proceedings of the Tenth Conference on Computational Natural Language Learning (CoNLL-X), New York, Jun. 2006, pp. 141-148.

\* cited by examiner

AUTOMATIC IDENTIFICATION AND USE OF ALTERNATE USER CONTACT INFORMATION

FIELD

This application relates generally to electronic messaging and, more particularly, to techniques for automatic identification and use of alternate user contact information.

BACKGROUND

Users can communicate with each other via computing devices (desktop computers, laptop computers, tablet computers, mobile phones, etc.). The computing devices can be configured for communication via a computing network, e.g., the Internet, and/or other suitable communication mediums, e.g., Bluetooth. The users transmit electronic messages back and forth to each other via their respective computing devices using a variety of different electronic messaging techniques, such as email, electronic chatting, and text messaging. These electronic messaging techniques typically use specific contact information associated with user profiles, such as email addresses and telephone numbers, to route the communications. Another example of contact information associated with a user profile is a physical address, such as a residence or a workplace. This information for a user, however, can change over time, and thus their corresponding user profile may be out of date. Examples of this information changing include the user registering for a new email account and/or a new telephone number, and the recipient user changing (moving) their residence and/or their workplace.

SUMMARY

A computer-implemented technique is presented. The technique can include obtaining, at a server having one or more processors, training electronic messages. The technique can include identifying, at the server, one or more contact information contexts in the training electronic messages, each contact information context corresponding to an instance of user contact information, each contact information indicative of a physical user address, a virtual user address, or a user telephone number. The technique can include determining, at the server, patterns from the contact information contexts, each pattern including a specific context around a specific contact information instance and an associated position for the specific contact information instance relative to the specific context. The technique can include applying, at the server, the patterns to the training electronic messages to extract candidate contact information that correspond to the associated positions to obtain extracted candidate contact information. The technique can include selecting, at the server, a set of the patterns based on the extracted candidate contact information. The technique can also include storing, at the server, the set of patterns.

In some embodiments, the training electronic messages are obtained from a plurality of training users, and each specific training electronic message includes at least one known contact information instance associated with a specific field of the specific training electronic message.

In other embodiments: identifying the one or more contact information contexts in the training electronic messages includes identifying N tokens surrounding each known contact information instance, wherein each token is a word or a punctuation, and determining the patterns includes determining context for each combination of the N tokens surrounding the known contact information instance and determining the associated position at the known contact information instance to obtain the patterns, wherein N is an integer greater than zero.

In some embodiments, selecting the set of the patterns includes selecting each pattern that, when applied to the training electronic messages, extracts candidate contact information having greater than a first predetermined matching accuracy with actual contact information instances in the training electronic messages.

In other embodiments, the technique further includes: obtaining, at the server, electronic messages associated with a target user, the target user having a registered profile, applying, at the server, the set of patterns to the electronic messages to extract candidate contact information for the target user, selecting, at the server, a set of the candidate contact information having greater than a predetermined usage rate in the electronic messages to obtain a set of alternate contact information for the target user, the predetermined usage rate being indicative of an appropriate level of use of a specific candidate contact information in order to select the specific candidate contact information as a specific alternate contact information, and storing, at the server, the set of alternate contact information associated with the registered profile for the target user.

In some embodiments, the technique further includes: detecting, at the server, a use of the registered profile by a source user at a computing device, and outputting, from the server, a suggestion for the source user to the computing device, the suggestion being based on a specific alternate contact information from the set of alternate contact information for the target user.

In other embodiments, the use of the specific alternate contact information by the source user is in a search query, and the suggestion is a result for the search query that is further based on the specific alternate contact information for the target user.

In some embodiments, the specific alternate contact information is a virtual address associated with the target user, and the use of the specific alternate contact information by the source user is one of: (i) in an address field of a draft electronic message or a body of the draft electronic message, wherein the suggestion is the virtual address associated with the target user, and (ii) at a social network website, wherein the suggestion is a suggestion for the source user to add a social network profile, indicated by the virtual address associated with the target user, to a group of social network profiles associated with the source user at the social network website.

In other embodiments, the specific alternate contact information is a physical address associated with the target user, and the use of the specific alternate contact information by the source user is by a navigation application, wherein the suggestion is the physical address associated with the target user.

In some embodiments, the specific alternate contact information is a telephone number associated with the target user, and the use of the specific alternate contact information by the source user by a telephone application, and wherein the suggestion is one of: (i) the telephone number associated with the target user, and (ii) in response to a telephone call from the telephone number, a name associated with the target user from their registered profile.

In other embodiments, the technique further includes providing, from the server to a computing device associated with a source user, the set of patterns, wherein receipt of the set of patterns causes the computing device to obtain a set of alternate contact information associated with the registered profile for a target user.

In some embodiments, receipt of the set of patterns further causes the computing device utilize a specific alternate contact information in response to a user of the registered profile for the target user at the computing device.

In other embodiments, receipt of the set of patterns causes the computing device to obtain the set of alternate contact information associated with the registered profile for the target user by causing the computing device to: apply the set of patterns to electronic messages associated with the target user to extract candidate contact information for the target user, select the set of alternate contact information from the candidate contact information by selecting candidate contact information having greater than a predetermined usage rate in the electronic messages, the predetermined usage rate being indicative of an appropriate level of use of a specific candidate contact information in order to select the specific candidate contact information as a specific alternate contact information, and store the set of alternate contact information associated with the registered profile for the target user.

Another computer-implemented technique is also presented. The technique can include obtaining, at a server having one or more processors, electronic messages associated with a target user, the target user having a registered profile. The technique can include applying, at the server, a set of patterns to the electronic messages to extract candidate contact information for the target user, each pattern of the set of patterns including specific contact information context and an associated position for a contact information instance relative to the specific contact information context. The technique can include selecting, at the server, a set of the candidate contact information to obtain a set of alternate contact information for the target user. The technique can include storing, at the server, the set of alternate contact information for the target user. The technique can include detecting, at the server, a use of a specific alternate contact information from the set of alternate contact information by a source user at a computing device. The technique can also include outputting, from the server, a suggestion for the source user to the computing device, the suggestion being based on the specific alternate contact information for the target user.

In some embodiments, selecting the set of alternate contact information for the target user includes selecting candidate contact information having greater than a predetermined usage rate in the electronic messages to obtain the set of alternate contact information for the target user, the predetermined usage rate being indicative of an appropriate level of use of a specific candidate contact information in order to select the specific candidate contact information as a specific alternate contact information.

In other embodiments, the use of the specific alternate contact information by the source user is in a search query, wherein the suggestion is a result for the search query that is further based on the specific alternate contact information for the target user.

In some embodiments, the specific alternate contact information is a virtual address associated with the target user, and the use of the specific alternate contact information by the source user is one of: (i) in an address field of a draft electronic message or a body of the draft electronic message, wherein the suggestion is the virtual address associated with the target user, and (ii) at a social network website, wherein the suggestion is a suggestion for the source user to add a social network profile, indicated by the virtual address associated with the target user, to a group of social network profiles associated with the source user at the social network website.

In other embodiments, the specific alternate contact information is a physical address associated with the target user, and the use of the specific alternate contact information by the source user is by a navigation application, wherein the suggestion is the physical address associated with the target user.

In some embodiments, the specific alternate contact information is a telephone number associated with the target user, and the use of the specific alternate contact information by the source user by a telephone application, and wherein the suggestion is one of: (i) the telephone number associated with the target user, and (ii) in response to a telephone call from the telephone number, a name associated with the target user from their registered profile.

In other embodiments, the technique further includes: obtaining, at the server, training electronic messages, identifying, at the server, one or more contact information contexts in the training electronic messages, and determining, at the server, candidate patterns from the contact information contexts, each pattern including specific contact information context and an associated position for a contact information instance relative to the specific contact information context, each candidate pattern being a candidate for the set of patterns.

In some embodiments, the technique further includes: applying, at the server, the candidate patterns to the training electronic messages to extract candidate contact information that correspond to the associated positions, selecting, at the server, each candidate pattern that, when applied to the training electronic messages, extracts candidate contact information having greater than a first predetermined matching accuracy with actual contact information instances in the training electronic messages to obtain the set of patterns, and storing, at the server, the set of the patterns.

In other embodiments, identifying the contact information context in the training electronic messages includes identifying, at the server, N tokens surrounding each known contact information instance, wherein each token is a word or a punctuation, and wherein N is an integer greater than zero.

In some embodiments, determining the patterns includes determining, at the server, contact information context for every combination of the N tokens surrounding the known contact information instance and determining the associated position at the known contact information instance to obtain the patterns.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
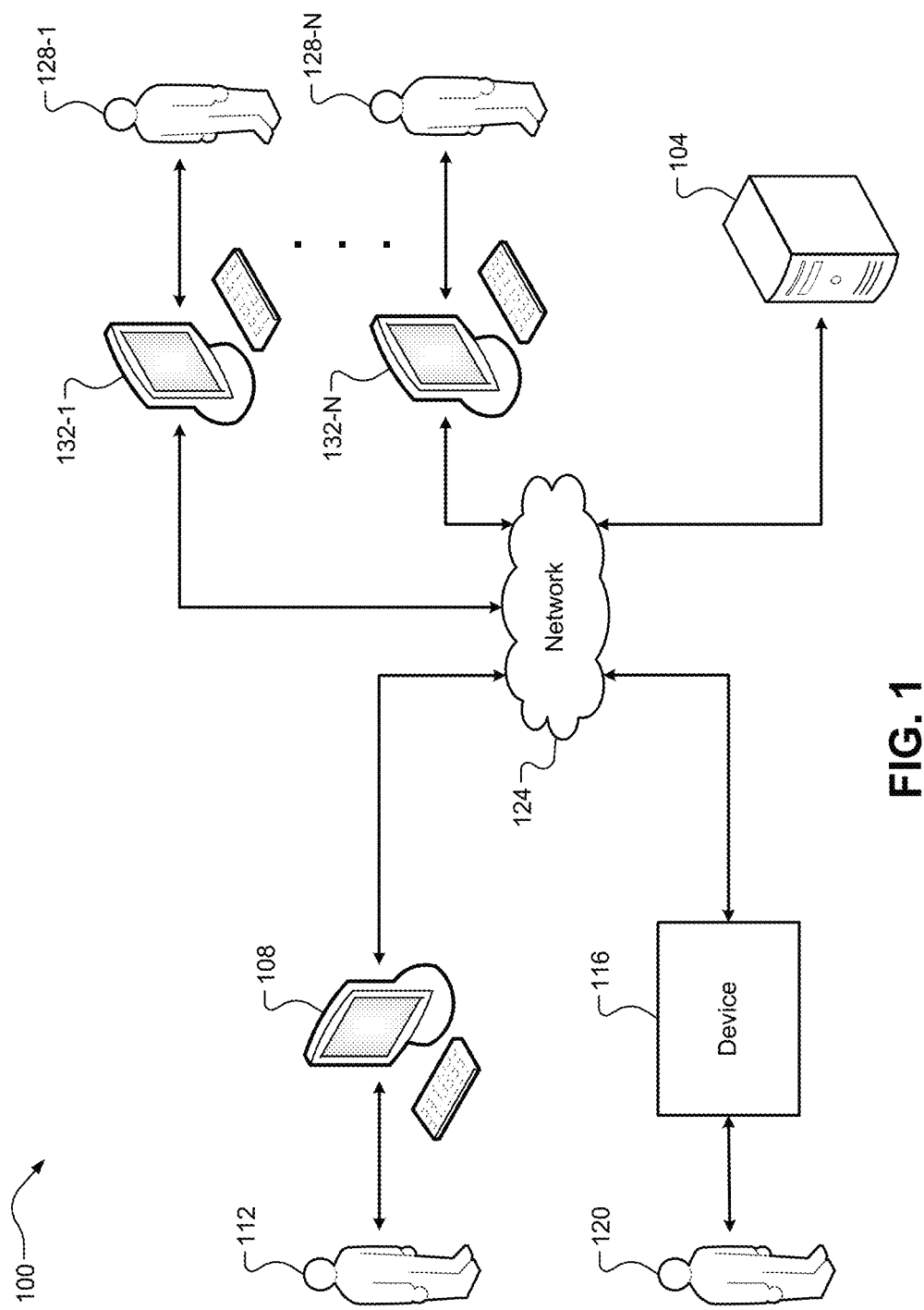
FIG. 1 depicts a computing system including an example server according to some implementations of the present disclosure.

Electronic messaging techniques (email, electronic chatting, text messaging, etc.) may associate a user profile with every user with whom a source user communicates. The electronic messaging techniques can then utilize a specific user profile to identify and transmit a message from the source user to a specific target user associated with the specific user profile. For example, the electronic messaging techniques can transmit the message from the source user to a virtual address of a set of contact information associated with the specific target user in their user profile. The term "virtual address" as used herein can refer to any information utilized to connect a user to one or more other users or computing resources via a computing network. Examples of virtual addresses include, but are not limited to, email addresses, social network addresses, user names, and textual and/or video chat application addresses.

User profiles can also include other contact information, such as physical addresses and/or a telephone numbers. The term "physical address" as used herein can refer to any geo-location associated with the target user. Examples of physical addresses include, but are not limited to, home (primary) residence addresses, vacation (secondary) residence addresses, workplace addresses, and other addresses (investments, rentals, etc.). The term "telephone number" as used herein can refer to any telephone number associated with the target user. Examples of telephone numbers include, but are not limited to, home telephone numbers, work telephone numbers, and mobile telephone numbers. As mentioned earlier, some of this contact information can change overtime, and thus the user may be required to manually update information for target users over time, which can be time consuming, error prone, and even overlooked.

Accordingly, techniques are presented for automatically identifying, suggesting, and using alternate user contact information. These techniques can provide for an improved user experience because automatically identifying, suggesting, and using alternate user contact information can be faster and more accurate than the manual input of alternate contact information by a source user, changed target contact information may be automatically detected and highlighted for a source user, the alternate contact information can be used to generate more intelligent suggestions for the source user, and so on. It should be appreciated that the term "alternate contact information" as used herein can refer to any contact information (virtual addresses, physical addresses, telephone numbers, etc.) that is not currently associated with a user profile of a specific target user. It should also be appreciated that while the techniques of the present disclosure are described as being implemented at a hardware computer server, these techniques can be implemented at a combination of hardware computer servers (parallel or distributed), a source user device, and at any suitable combination of computing device(s) including one or more processors. In addition, source user records for the target user may be updated so that future communications with the target user are directed to the alternate (i.e., updated) contact information. This updating may be automatic or may be an option provided to the source user to update or not update the source user's records to reflect the alternate contact information (e.g., to change or not change the source user's contact database).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how and whether information is collected about the user and used by a content server.

Referring now to FIG. 1, a computing system 100 is illustrated. The computing system 100 can include an example server 104 according to some implementations of the present disclosure. A "server" can refer to any suitable hardware computer server that includes one or more processors and is configured to implement the techniques according to some implementations of the present disclosure. A server can also be a system that includes one or more devices, e.g., multiple devices configured to execute the techniques of the present disclosure. The computing system 100 can also include a computing device 108 associated with a source user 112 and a device 116 associated with a target user 120. Examples of the device 116 include (i) a computing device, such as a desktop computer, a laptop computer, a tablet computer, or a mobile phone, and (ii) a conventional landline telephone.

The device 116 can be configured to communicate with the computing device 108 via a network 124. For example, the network 124 can include a local area network (LAN), a wide area network (WAN), e.g., the Internet, a telephone network, such as a public switched telephone network (PSTN), or a combination thereof. The network 124 can also represent other suitable communication mediums (Bluetooth, WiFi Direct, near field communication (NFC), etc.). The source user 112 can utilize the computing device 108 to perform various operations based on the contact information stored in a user profile for the target user 120. Examples of these operations include, but are not limited to, electronic messaging operations, social network operations, telephone operations, and navigation operations.

The computing system 100 can also include a plurality of training users 128-1 . . . 128-N (N>1, collectively referred to as "training users 128") associated with a plurality of training computing devices 132-1 . . . 132-N (collectively referred to as "training computing devices 132"), respectively. The training users 128 can represent any users that transmit electronic messages via the network 124 using their respective training computing devices 132. For example, these electronic messages may be configured to be routed through the server 104. These electronic messages can also be referred to as training data. More specifically, the server 104 can utilize these electronic messages as part of the techniques according to some implementations of the present disclosure, which are described in detail below. It should be appreciated that while the techniques are described with respect to the server 104, the techniques could also be similarly implemented at the computing device 108 or any other suitable computing device.

The server 104 can identify contact information context in the electronic messages (the training data) to determine patterns that each include specific contact information context and an identifier for a contact information instance. The server 104 can then select and store a set of the patterns that, when applied to the electronic messages, extract candidate contact information having greater than a predetermined matching accuracy with actual contact information in the electronic messages. The server 104 can additionally or alternatively apply patterns to electronic messages associated with the target user 120 to select and store a set of alternate contact information of the target user 120 having greater than a predetermined usage rate in the electronic messages. The predetermined usage rate may be indicative of an appropriate level of use of a specific candidate contact information in order to select the specific candidate contact information as a specific alternate contact information. In other words, the predetermined usage rate may represent a predetermined level of use corresponding to an appropriate level of confidence in selecting candidate contact information as alternate contact information. The server 104 can then detect a use of the alternate contact information of the target user 120 by the source user 112, and output a suggestion identifying the target user 120 to the source user 112. These techniques are now described in more detail below.

Figure 2:
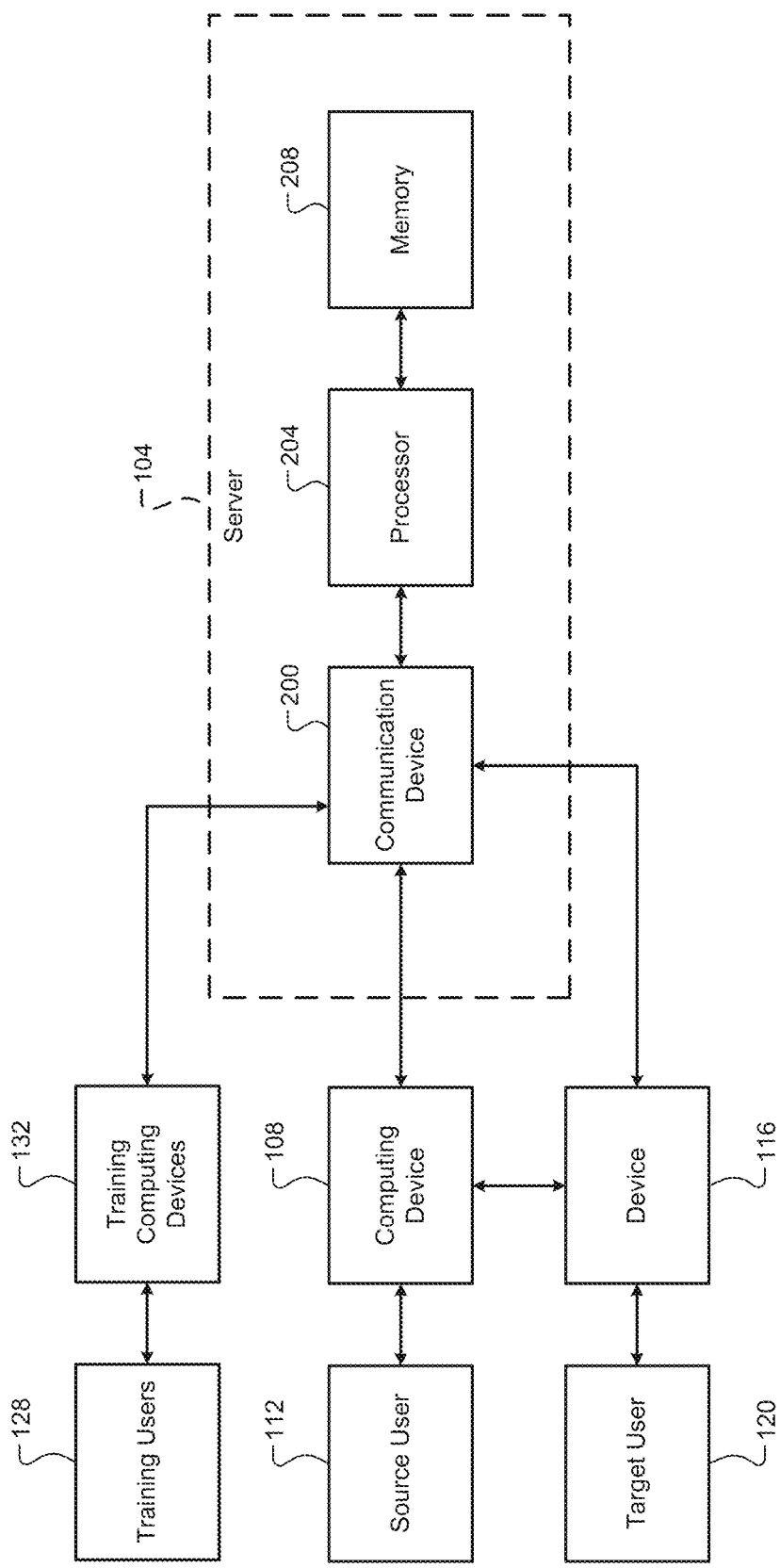
FIG. 2 depicts a functional block diagram of the example server of FIG. 1.

Referring now to FIG. 2, a functional block diagram of the example server 104 is illustrated. The server 104 can include a communication device 200, a processor 204, and a memory 208. It should be appreciated that the server 104 can also include other suitable computing components, and the term "processor" as used herein can refer to both a single processor and a plurality of processors operating in a parallel or distributed architecture.

The processor 204 can control operation of the server 104. Specifically, the processor 204 can perform functions including, but not limited to loading/executing an operating system of the server 104, controlling communication with other components on the network 124 via the communication device 200, and controlling read/write operations at the memory 208. The communication device 200 can include any suitable components (e.g., a transceiver) configured for communication via the network 124. The memory 208 can be any suitable storage medium (flash, hard disk, etc.) configured to store information at the server 104. The processor 204 can also be configured to wholly or partially execute the techniques according to some implementations of the present disclosure, which are more fully described below.

The processor 204 can obtain a training corpus of electronic messages and use it to identify patterns. Examples of electronic messages include electronic mail, electronic chatting, text messaging, blogs, social media posts, and other electronic documents that reference one or more users. The processor 204 could also obtain an electronic document from other suitable electronic data associated with one or more users, e.g., text of voicemails obtained via speech-to-text. The processor 204 can obtain these electronic messages from the memory 208 and/or from one or more other computing devices via the communication device 200. These electronic messages can be used to determine patterns of name context, and the patterns can then be used in determining alternate names for users. These electronic messages, therefore, can also be referred to as "training electronic messages" or "training data." For example, the training electronic messages can be associated with the training users 128 and can be obtained at the processor 204 from the training computers 132 via the network 124 using the communication device 200.

After obtaining a number of training electronic messages, the processor 204 can identify contact information context in the training electronic messages in the training corpus. It should be appreciated that the term "contact information context" as used herein can refer to any text that is often presented in the context of contact information. For example only, the contact information context can refer to common phrases that are followed by a contact information instance ("my number is," "contact me at," etc.). Specifically, the processor 204 can identify N tokens surrounding each known contact information instance in each of the training electronic messages (N>0), where a "token" refers to a word, word group, word part, symbol, or a punctuation. For example, a comma and a phrase "please call me" may follow a contact information instance at an end portion of a message. Additionally, for example, a question mark may follow a contact information instance at an end portion of a message, e.g., "Could you give me a call?" The processor 204 can identify known contact information instances by identifying particular fields in the training electronic messages in which contact information is typically used, e.g., TO and FROM fields in electronic mail. It should be appreciated that the processor 204 could also identify known contact information instances by utilizing other suitable resources, such as a telephone directory.

For example, one of the training electronic messages may be an electronic mail sent from Joan Smith. This electronic mail can conclude with the text "My number is 650-123-4567, please call me." The processor 204 could identify Joan Smith and her known contact information instance (650-123-4567) by matching her known email in her user profile with the FROM field of the electronic mail. The processor 204 could then identify N tokens surrounding the contact information instance. As previously mentioned, however, the processor 204 can remove the actual contact information instance after confirming that it is a known contact information instance. In this case, a placeholder or identifier could be inserted in place of the known contact information instance. In general, however, the processor 204 can identify an associated position for a contact information instance relative to the contact information context, e.g., before the phrase "please call me."

In this example of the electronic mail from Joan Smith, the processor 204 could identify patterns of up to N=4 tokens. The resulting patterns identified by the processor 204 could include:

My number is $NUMBER
My number is $NUMBER,
number is $NUMBER
number is $NUMBER, please
is $NUMBER
is $NUMBER,
is $NUMBER, please
is $NUMBER, please call
$NUMBER,
$NUMBER, please
$NUMBER, please call
$NUMBER, please call me where $NUMBER represents the placeholder or identifier for the known contact information instance 650-123-4567 for Joan Smith. In some implementations, the known contact information instance appears in a known/common portion of the electronic message, such as a signature block, and thus the pattern could identify the placeholder or identifier with respect to the known/common portion (e.g., "(signature): $NUMBER").

After determining the patterns of contact information context from the training electronic messages, the processor 204 can apply the patterns to the training electronic messages to extract candidate contact information from the training electronic messages. The candidate contact information can be extracted by matching the contact information context of a specific pattern to a specific training electronic message and then extracting a contact information instance using the associated position of the specific pattern. The processor 204 can then select a set of the patterns based on the extracted contact information to obtain a set of patterns. More specifically, the processor 204 can select the set of patterns based on statistics of the extracted contact information, which indicate accuracies of the patterns, respectively. For example only, the pattern "My number is $NUMBER" may be identified in 5000 electronic mails, and the extracted contact information ($NUMBER) may match the user profile associated with the FROM field of the corresponding electronic mail in 4000 of the electronic mails. The resulting accuracy would be 4000/5000, or 80%.

The processor 204 can then select the set of patterns by selecting each pattern that, when applied to the training electronic messages, reliably extracts candidate contact information. Useful patterns can be selected using any of a variety of criteria, e.g., as having greater than a first predetermined matching accuracy with actual contact information instances in the training electronic messages. In other words, the processor 204 can calculate the accuracy of each of the patterns based on the gathered statistics, and can then select each of the patterns having greater than the first predetermined matching accuracy to obtain the set of patterns. The first predetermined matching accuracy can be indicative of a high degree of reliability that a specific pattern can be used to extract actual contact information instances from electronic messages. For example only, the first predetermined matching accuracy may be 80%, however, other suitable values for the first predetermined matching accuracy could be used, e.g., 50%. The set of patterns 204 can be stored at the memory 208 for later use. It should be appreciated that one or more of the set of patterns could also be revised in response to analysis of new training data.

After selecting the set of patterns, the set of patterns can then be applied to determine alternate user contact information. The patterns can be applied to any corpus of electronic messages, typically electronic messages that were not in the training corpus. For example, the processor 204 can obtain electronic messages associated with the target user 120 with the user's consent or on the user's request. The electronic messages are associated with a registered profile of the target user 120. The registered profile can be any suitable computer profile or account having at least one registered contact information for the target user 120 (an electronic mail address/account, an electronic chatting username, a text messaging name/phone number, a blog or social media account, etc.). The processor 204 can obtain the electronic messages from the memory 208, e.g., server-side electronic message storage, and/or from one or more other computing devices, e.g., the computing device 108, via the communication device 200. At least some of the electronic messages could also be obtained from other computing devices via the communication device 200, with the appropriate consent of the respective users. In addition, any transmission of the electronic messages can include appropriate encryption to protect sensitive user information.

The processor 204 can then apply the set of patterns to the electronic messages to extract candidate contact information for the target user 120. This candidate contact information represents potential alternate contact information for the target user 120. Rather, this candidate contact information includes potential alternatives to the at least one registered contact information of the registered profile of the target user 120. After extracting the candidate contact information for the first user 120, the processor 204 can then select a set of the candidate contact information having greater than a predetermined usage rate in the electronic messages to obtain a set of alternate contact information for the target user 120. The predetermined usage rate can be indicative of a high degree of reliability that a specific contact information is an alternate contact information for the target user 120. The predetermined usage rate could be a predetermined number of usages/occurrences in the electronic messages, a predetermined usage percentage, or another suitable metric. For example only, the predetermined usage rate could be 100 usages/occurrences in the electronic messages.

The processor 204 can then store the set of alternate contact information for the target user 120 at the memory 208. It should be appreciated, however, that the set of alternate contact information could be revised in response to new/future electronic messages associated with the registered profile of the target user 120. In some cases, the set of alternate contact information may conflict with existing contact information for the target user 120. In these cases, the processor 204 may overwrite the existing contact information for the target user 120 with the set of alternate contact information. Alternatively, the processor 204 may output a user prompt for confirmation of the validity of the existing and/or alternate contact information, or for confirmation of discarding the existing contact information. In other cases, the set of alternate contact information may conflict with contact information stored for other users. In these cases, the processor 204 may discard the any conflicting alternate contact information instead of storing it in association with the target user 120. Alternatively, the processor 204 may output a user prompt for confirmation of the validity of the conflicting alternate contact information or for confirmation of discarding the conflicting alternate contact information.

Once the processor 204 has determined the set of alternate contact information for the target user 120, the processor 204 can provide suggestions to help assist other users, such as the source user 112. More specifically, the processor 204 can detect a use of a specific alternate contact information from the set of alternate contact information by another user at a computing device. For the purposes of this disclosure, the other user will be the source user 112 and the computing device will be the computing device 108. The processor 204 could detect the use of the specific alternate contact information using any suitable techniques, such as direct interaction with the computing device 108 via the network 124 or by being notified by another computing device of the use by the source user 112 at the computing device 108. In response to detecting that the source user 112 has used the specific alternate contact information from the set of alternate contact information for the target user 120, the processor 204 can perform one or more actions/operations.

Specifically, the processor 204 can output a suggestion to the source user 112 at the computing device 108 via the network 124 using the communication device 200. The term "suggestion" as used herein can be any type of information generally indicative of the registered profile of the target user 120 (e.g., a name of the target user 120) or indicative of the specific alternate contact information for the target user 120 from their registered profile. Examples of detectable uses by the source user 112 can include, but are not limited to (i) selecting the registered profile of the target user 120 in electronic messaging or social networking at the computing device 108, (ii) selecting registered profile of the target user 120 in a navigation application executing at the computing device 108, and (iii) selecting the registered profile or receiving a call from the target user 120 in a telephone application executing at the computing device 108. Specific example suggestions for the various example uses above will now be described. In one example, the source user 112 can input a search query via the computing device 108 (a textual input, a speech input, or a combination thereof) referencing the target user 120. This reference could be to the registered profile of the target user 120 or to contact information in the registered profile (e.g., a name of the target user 120). For example only, the search query could be "What is Joan Smith's phone number?" In response to the search query, a suggestion in the form of search results can be provided, which can include a specific alternate contact information from the set of alternate contact information, e.g., "Joan Smith's phone number is 650-123-4567."

In another example, the source user 112 can generate an electronic message (email, text message, textual chat, video chat, etc.) on the computing device 108 that is intended for the target user 120. In response to selecting the registered profile of the target user 120, a specific alternate virtual address can be selected from the set of alternate contact information and input to the address field of the electronic message. Both the selection and input can be performed either automatically or in response to an acknowledgement from the source user 112, e.g., in response to a prompt. In another example, the source user 112 can be using a social network at the computing device 108, such as a social network website. In response to selecting the registered profile of the target user 120, a specific virtual address can be selected from the set of alternate contact information and used to identify and add a social network profile for the target user 120 to a group of social network profiles associated with the source user 112 in the social network. Both the selection and adding can be performed either automatically or in response to an acknowledgement from the source user 112, e.g., in response to a prompt.

In another example, the source user 112 can be utilizing a navigation application at the computing device 108. In response to selecting the registered profile of the target user 120, a specific alternate physical address of the target user 120 can be selected from the set of alternate contact information and input to the navigation application causing directions to the specific alternate physical address to be generated. Both the selection and input to the navigation application can be performed either automatically or in response to an acknowledgement from the source user 112, e.g., in response to a prompt. In yet another example, the source user 112 can be utilizing a telephone application at the computing device 108. In response to selecting the registered profile of the target user 120, a specific alternate telephone number of the target user 120 can be selected from the set of alternate contact information and input to the telephone application causing a telephone call to be initiated. Both the selection and input to the navigation application can be performed either automatically or in response to an acknowledgement from the source user 112, e.g., in response to a prompt. In still another example, in response to receiving an incoming telephone call from a specific alternate telephone number of the target user 120, a name of the target user 120 from the registered profile ("caller identification") can be output at the computing device 108 for the source user 112.

In another implementation, the server 104 can obtain the set of patterns and then provide the set of patterns to the computing device 108. The computing device 108 can then utilize the set of patterns to identify alternate contact information for the target user 120. For example, the computing device 108 may apply the set of patterns to electronic messages associated with the target user 120 that are stored locally at the computing device 108. Alternatively, for example, the computing device 108 could obtain at least some electronic messages associated with the target user 120 from the server 104. After obtaining the alternate contact information for the target user 120, the computing device 108 can then utilize the alternate contact information. This may include storing the alternate contact information in a local profile associate with the target user 120 at the computing device 108 and/or updating the registered profile for the target user 120 at the server 104. This may also include providing suggestions for the source user 112 with respect to the target user 120 at the computing device 108 (name suggestions, virtual/physical address suggestions, phone-related suggestions, etc.).

Figure 3:
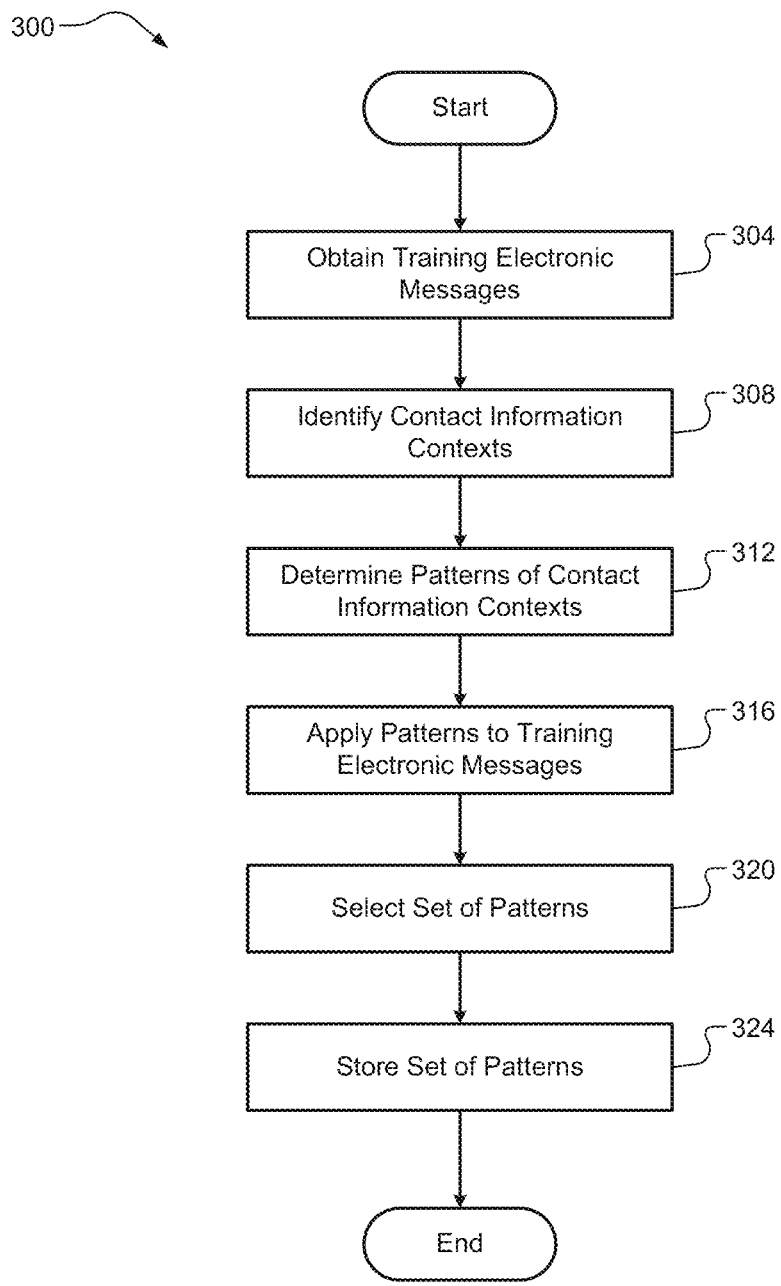
FIG. 3 depicts a flow diagram of an example technique for automatically determining patterns of contact information context from electronic messages according to some implementations of the present disclosure.

Referring now to FIG. 3, a flow diagram of an example technique 300 for automatically determining patterns of contact information context from electronic messages is illustrated. At 304, the server 104 can obtain the training electronic messages. At 308, the server 104 can identify one or more contact information contexts in the training electronic messages. At 312, the server 104 can determine patterns from the contact information contexts, each pattern including a specific context around a specific contact information instance and an associated position for the specific contact information instance relative to the specific context. At 316, the server 104 can apply the patterns to the training electronic messages to extract candidate contact information that correspond to the associated positions to obtain extracted candidate contact information. At 320, the server 104 can select a set of the patterns based on the extracted candidate contact information. For example, the server 104 may determine which of the patterns produces a matching accuracy greater than a desired accuracy threshold to obtain the set of patterns. At 324, the server 104 can store the set of patterns, e.g., for future use. The technique 300 can then end or return to 304.

Figure 4:
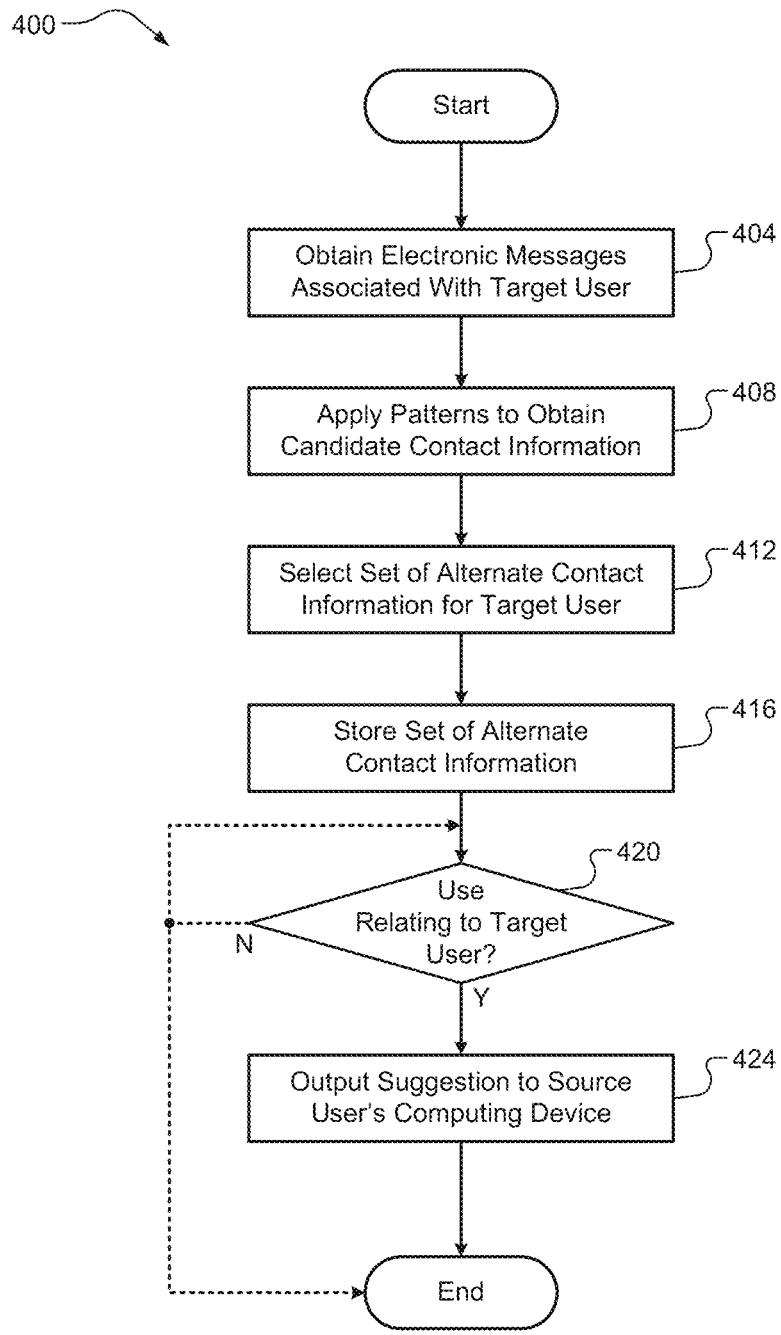
FIG. 4 depicts a flow diagram of an example technique for automatically determining and using alternate user contact information according to some implementations of the present disclosure.

Referring now to FIG. 4, a flow diagram of an example technique 400 for automatically determining and using alternate user contact information is illustrated. At 404, the server 104 can obtain electronic messages associated with the target user 120. At 408, the server 104 can apply a set of patterns to the electronic messages to extract candidate contact information for the target user 120. At 412, the server 104 can select a set of the candidate contact information to obtain a set of alternate contact information for the target user 120. At 416, the server 104 can store the set of alternate contact information for the target user 120. At 420, the server 104 can detect a use of a specific alternate contact information from the set of alternate contact information by the source user 112 at the computing device 108. When the use of the specific alternate contact information is not detected, the technique 400 can end or return to 420. When the use of the specific alternate contact information is detected, the technique 400 can proceed to 424. At 424, the server 104 can output a suggestion for the source user 112 to the computing device 108, the suggestion being based on the specific alternate contact information for the target user 120. The technique 400 can then end or return to 404.

Numerous specific details are set forth such as examples of specific components, devices, and methods, to illustrate different possible embodiments of the present disclosure. It will be apparent to those skilled in the art that not all specific details need be employed, that example embodiments may be embodied in many different forms and that neither should be construed to limit the scope of the disclosure. The method steps, processes, and operations described herein are not to be construed as necessarily requiring their performance in the particular order discussed or illustrated, unless specifically identified as an order of performance. It is also to be understood that additional or alternative steps may be employed.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, electrically-addressed non-volatile memory (NVM) (e.g., mask read-only memory (ROM), erasable programmable ROM (EPROM), electrically erasable programmable ROM (EEPROM), magnetoresistive random-access memory (RAM) (MRAM) and ferroelectric RAM (FRAM)), mechanically-addressed NVM (e.g., flash memory, hard disks, optical discs, such as CDs/DVDs, magnetic discs or tape, and holographic memory), volatile memory (e.g., random access memory (RAM), such as static RAM (SRAM) and dynamic RAM (DRAM), application specific integrated circuits (ASICs), organic or organic-based memory, or any other type of media suitable for storing information electronically. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    obtaining, at a server having one or more processors, training electronic messages associated with a plurality of training users, wherein each specific training electronic message includes at least one known contact information instance associated with a specific field of the specific training electronic message;
    identifying, at the server, one or more contact information contexts in the training electronic messages, each contact information context corresponding to an instance of user contact information, each user contact information indicative of at least one of a physical user address, a virtual user address, and a user telephone number;
    determining, at the server, patterns from the contact information contexts, each pattern including a specific context around a specific contact information instance and an associated position for the specific contact information instance relative to the specific context;
    applying, at the server, the patterns to the training electronic messages to extract candidate contact information that correspond to the associated positions to obtain extracted candidate contact information;
    selecting, at the server, a set of the patterns based on the extracted candidate contact information; and
    storing, at the server, the set of patterns.

2. The computer-implemented method of claim 1, wherein:
    identifying the one or more contact information contexts in the training electronic messages includes identifying N tokens surrounding each known contact information instance, wherein each token is a word or a punctuation; and
    determining the patterns includes determining context for each combination of the N tokens surrounding the known contact information instance and determining the associated position at the known contact information instance to obtain the patterns,
    wherein N is an integer greater than zero.

3. The computer-implemented method of claim 1, wherein selecting the set of the patterns includes selecting each pattern that, when applied to the training electronic messages, extracts candidate contact information having greater than a first predetermined matching accuracy with actual contact information instances in the training electronic messages.

4. The computer-implemented method of claim 1, further comprising:
    obtaining, at the server, electronic messages associated with a target user, the target user having a registered profile;
    applying, at the server, the set of patterns to the electronic messages to extract candidate contact information for the target user;
    selecting, at the server, a set of the candidate contact information having greater than a predetermined usage rate in the electronic messages to obtain a set of alternate contact information for the target user, the predetermined usage rate being indicative of an appropriate level of use of a specific candidate contact information in order to select the specific candidate contact information as a specific alternate contact information; and
    storing, at the server, the set of alternate contact information associated with the registered profile for the target user.

5. The computer-implemented method of claim 4, further comprising:
    detecting, at the server, a use of the registered profile by a source user at a computing device; and
    outputting, from the server, a suggestion for the source user to the computing device, the suggestion being based on a specific alternate contact information from the set of alternate contact information for the target user.

6. The computer-implemented method of claim 5, wherein the use of the specific alternate contact information by the source user is in a search query, wherein the suggestion is a result for the search query that is further based on the specific alternate contact information for the target user.

7. The computer-implemented method of claim 5, wherein the specific alternate contact information is a virtual address associated with the target user, and wherein the use of the specific alternate contact information by the source user is one of:
    (i) in an address field of a draft electronic message or a body of the draft electronic message, wherein the suggestion is the virtual address associated with the target user; and
    (ii) at a social network website, wherein the suggestion is a suggestion for the source user to add a social network profile, indicated by the virtual address associated with the target user, to a group of social network profiles associated with the source user at the social network website.

8. The computer-implemented method of claim 5, wherein the specific alternate contact information is a physical address associated with the target user, and wherein the use of the specific alternate contact information by the source user is by a navigation application, wherein the suggestion is the physical address associated with the target user.

9. The computer-implemented method of claim 5, wherein the specific alternate contact information is a telephone number associated with the target user, wherein the use of the specific alternate contact information by the source user by a telephone application, and wherein the suggestion is one of:
    (i) the telephone number associated with the target user; and
    (ii) in response to a telephone call from the telephone number, a name associated with the target user from their registered profile.

10. The computer-implemented method of claim 1, further comprising providing, from the server to a computing device associated with a source user, the set of patterns, wherein receipt of the set of patterns causes the computing device to obtain a set of alternate contact information associated with the registered profile for a target user.

11. The computer-implemented method of claim 10, wherein receipt of the set of patterns further causes the computing device utilize a specific alternate contact information in response to a user of the registered profile for the target user at the computing device.

12. The computer-implemented method of claim 10, wherein receipt of the set of patterns causes the computing device to obtain the set of alternate contact information associated with the registered profile for the target user by causing the computing device to:

apply the set of patterns to electronic messages associated with the target user to extract candidate contact information for the target user;

select the set of alternate contact information from the candidate contact information by selecting candidate contact information having greater than a predetermined usage rate in the electronic messages, the predetermined usage rate being indicative of an appropriate level of use of a specific candidate contact information in order to select the specific candidate contact information as a specific alternate contact information; and store the set of alternate contact information associated with the registered profile for the target user.

13. A computer-implemented method, comprising:

obtaining, at a server having one or more processors, electronic messages associated with a target user, the target user having a registered profile;

applying, at the server, a set of patterns to the electronic messages to extract candidate contact information for the target user, each pattern of the set of patterns including specific contact information context and an associated position for a contact information instance relative to the specific contact information context;

selecting, at the server, a set of the candidate contact information to obtain a set of alternate contact information for the target user;

storing, at the server, the set of alternate contact information for the target user;

detecting, at the server, a use of a specific alternate contact information from the set of alternate contact information by a source user at a computing device; and outputting, from the server, a suggestion for the source user to the computing device, the suggestion being based on the specific alternate contact information for the target user.

14. The computer-implemented method of claim 13, wherein selecting the set of alternate contact information for the target user includes selecting candidate contact information having greater than a predetermined usage rate in the electronic messages to obtain the set of alternate contact information for the target user, the predetermined usage rate being indicative of an appropriate level of use of a specific candidate contact information in order to select the specific candidate contact information as a specific alternate contact information.

15. The computer-implemented method of claim 13, wherein the use of the specific alternate contact information by the source user is in a search query, wherein the suggestion is a result for the search query that is further based on the specific alternate contact information for the target user.

16. The computer-implemented method of claim 13, wherein the specific alternate contact information is a virtual address associated with the target user, and wherein the use of the specific alternate contact information by the source user is one of:
    (i) in an address field of a draft electronic message or a body of the draft electronic message, wherein the suggestion is the virtual address associated with the target user; and
    (ii) at a social network website, wherein the suggestion is a suggestion for the source user to add a social network profile, indicated by the virtual address associated with the target user, to a group of social network profiles associated with the source user at the social network website.

17. The computer-implemented method of claim 13, wherein the specific alternate contact information is a physical address associated with the target user, and wherein the use of the specific alternate contact information by the source user is by a navigation application, wherein the suggestion is the physical address associated with the target user.

18. The computer-implemented method of claim 13, wherein the specific alternate contact information is a telephone number associated with the target user, wherein the use of the specific alternate contact information by the source user by a telephone application, and wherein the suggestion is one of:
    (i) the telephone number associated with the target user; and
    (ii) in response to a telephone call from the telephone number, a name associated with the target user from their registered profile.

19. The computer-implemented method of claim 13, further comprising:

obtaining, at the server, training electronic messages;

identifying, at the server, one or more contact information contexts in the training electronic messages; and determining, at the server, candidate patterns from the contact information contexts, each pattern including specific contact information context and an associated position for a contact information instance relative to the specific contact information context, each candidate pattern being a candidate for the set of patterns.

20. The computer-implemented method of claim 19, further comprising:

applying, at the server, the candidate patterns to the training electronic messages to extract candidate contact information that correspond to the associated positions;

selecting, at the server, each candidate pattern that, when applied to the training electronic messages, extracts candidate contact information having greater than a first predetermined matching accuracy with actual contact information instances in the training electronic messages to obtain the set of patterns; and storing, at the server, the set of the patterns.

21. The computer-implemented method of claim 20, wherein identifying the contact information context in the training electronic messages includes identifying, at the server, N tokens surrounding each known contact information instance, wherein each token is a word or a punctuation, and wherein N is an integer greater than zero.

22. The computer-implemented method of claim 21, wherein determining the patterns includes determining, at the server, contact information context for every combination of the N tokens surrounding the known contact information instance and determining the associated position at the known contact information instance to obtain the patterns.

* * * * *